United States Patent
Patel et al.

(10) Patent No.: US 8,726,668 B2
(45) Date of Patent: May 20, 2014

(54) FUEL ATOMIZATION DUAL ORIFICE FUEL NOZZLE

(75) Inventors: Nayan Vinodbhai Patel, Liberty Township, OH (US); Michael Anthony Benjamin, Cincinnati, OH (US); Duane Douglas Thomsen, Lebanon, OH (US); Alfred Albert Mancini, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 817 days.

(21) Appl. No.: 12/971,597

(22) Filed: Dec. 17, 2010

(65) Prior Publication Data

US 2012/0151930 A1    Jun. 21, 2012

(51) Int. Cl.
*F02C 1/00* (2006.01)

(52) U.S. Cl.
USPC .................................. 60/748; 60/742; 60/746

(58) Field of Classification Search
USPC ........................................... 60/742, 746, 748
See application file for complete search history.

(56) References Cited

U.S. PATENT DOCUMENTS

| | | | | |
|---|---|---|---|---|
| 2,884,758 | A * | 5/1959 | Oberle | 60/39.463 |
| 3,013,732 | A * | 12/1961 | Webster et al. | 239/404 |
| 4,265,615 | A * | 5/1981 | Lohmann et al. | 431/353 |
| 5,144,804 | A * | 9/1992 | Koblish et al. | 60/740 |
| 6,389,815 | B1 * | 5/2002 | Hura et al. | 60/746 |
| 6,718,770 | B2 | 4/2004 | Laing et al. | |
| 6,775,984 | B2 * | 8/2004 | Lavie et al. | 60/740 |
| 6,865,889 | B2 | 3/2005 | Mancini et al. | |
| 6,898,926 | B2 | 5/2005 | Mancini | |
| 6,955,040 | B1 | 10/2005 | Myers, Jr. et al. | |
| 7,669,420 | B2 | 3/2010 | Spooner | |
| 7,779,636 | B2 | 8/2010 | Buelow et al. | |
| 7,788,927 | B2 | 9/2010 | McMasters et al. | |
| 8,336,313 | B2 * | 12/2012 | McMasters et al. | 60/742 |
| 8,387,391 | B2 * | 3/2013 | Patel et al. | 60/740 |
| 2005/0198964 | A1 | 9/2005 | Myers, Jr. et al. | |
| 2007/0028618 | A1 * | 2/2007 | Hsiao et al. | 60/737 |
| 2007/0137207 | A1 | 6/2007 | Mancini et al. | |
| 2009/0255260 | A1 | 10/2009 | McMasters et al. | |
| 2009/0255262 | A1 | 10/2009 | McMasters et al. | |
| 2009/0255265 | A1 | 10/2009 | McMasters et al. | |
| 2009/0256007 | A1 * | 10/2009 | McMasters et al. | 239/463 |
| 2010/0050644 | A1 | 3/2010 | Pidcock et al. | |
| 2010/0065142 | A1 | 3/2010 | McMasters et al. | |
| 2010/0181393 | A1 * | 7/2010 | Pitzer et al. | 239/587.5 |
| 2010/0263382 | A1 | 10/2010 | Mancini et al. | |
| 2012/0151928 | A1 | 6/2012 | Patel et al. | |

\* cited by examiner

*Primary Examiner* — Ehud Gartenberg
*Assistant Examiner* — Lorne Meade
(74) *Attorney, Agent, or Firm* — General Electric Company; Steven J. Rosen (57) ABSTRACT

A pilot fuel injector tip includes concentric primary and secondary pilot fuel nozzles having a circular primary exit axially aft and downstream of an annular secondary exit respectively. A fuel nozzle assembly includes a pilot swirler flowpath section having an annular inwardly tapering conical flowpath section surrounding primary and secondary exits. An inwardly tapering conical wall section radially inwardly bounding flowpath section defines a conical surface. Exits are located at or axially forward or upstream of the conical surface. An annular secondary fuel supply passage in secondary pilot fuel nozzle includes a secondary fuel swirler with an array of helical spin slots that may have rectangular cross sections. A chamfered leading edge of an annular wall section disposed between an outer pilot swirler and an inlet to an injector cooling flowpath surrounding the second pilot swirler includes a radially inwardly facing conical chamfered surface for deflecting dirt from cooling flowpath.

6 Claims, 8 Drawing Sheets

FUEL ATOMIZATION DUAL ORIFICE FUEL NOZZLE

BACKGROUND OF THE INVENTION

1. Field of the Invention

The present invention relates to gas turbine engine fuel nozzles and, more particularly, to such fuel nozzles having pilot fuel injector tips containing dual orifice pilot fuel nozzles.

2. Description of Related Art

Aircraft gas turbine engine staged combustion systems have been developed to limit the production of undesirable combustion product components such as oxides of nitrogen (NOx), unburned hydrocarbons (HC), and carbon monoxide (CO) particularly in the vicinity of airports, where they contribute to urban photochemical smog problems. Gas turbine engines also are designed to be fuel efficient and have a low cost of operation. Other factors that influence combustor design are the desires of users of gas turbine engines for efficient, low cost operation, which translates into a need for reduced fuel consumption while at the same time maintaining or even increasing engine output. As a consequence, important design criteria for aircraft gas turbine engine combustion systems include provisions for high combustion temperatures, in order to provide high thermal efficiency under a variety of engine operating conditions, as well as minimizing undesirable combustion conditions that contribute to the emission of particulates, and to the emission of undesirable gases, and to the emission of combustion products that are precursors to the formation of photochemical smog.

One mixer design that has been utilized is known as a twin annular premixing swirler (TAPS), which is disclosed in the following U.S. Pat. Nos. 6,354,072; 6,363,726; 6,367,262; 6,381,964; 6,389,815; 6,418,726; 6,453,660; 6,484,489; and, 6,865,889. It will be understood that the TAPS mixer assembly includes a pilot mixer which is supplied with fuel during the entire engine operating cycle and a main mixer which is supplied with fuel only during increased power conditions of the engine operating cycle. While improvements in the main mixer of the assembly during high power conditions (i.e., take-off and climb) are disclosed in patent application Ser. No. 11/188,598 (PUBLICATION NUMBER 20070028618) and U.S. Pat. Nos. 7,464,553 and 7,581,396, modification of the pilot mixer is desired to improve operability across other portions of the engine's operating envelope (i.e., idle, approach and cruise) while maintaining combustion efficiency. To this end and in order to provide increased functionality and flexibility, the pilot mixer in a TAPS type mixer assembly has been developed and is disclosed in U.S. Pat. No. 7,762,073, entitled "Pilot Mixer For Mixer Assembly Of A Gas Turbine Engine Combustor Having A Primary Fuel Injector And A Plurality Of Secondary Fuel Injection Ports" which issued Jul. 27, 2010. This patent is owned by the assignee of the present application and hereby incorporated by reference.

U.S. patent application Ser. No. 12/424,612 (PUBLICATION NUMBER 20100263382), filed Apr. 16, 2009, entitled "DUAL ORIFICE PILOT FUEL INJECTOR" discloses a fuel nozzle having first second pilot fuel nozzles designed to improve sub-idle efficiency, reduced circumferential exhaust gas temperature (EGT) variation while maintaining a low susceptibility to coking of the fuel injectors. This patent application is owned by the assignee of the present application and hereby incorporated by reference.

It is highly desirable to improve the operating efficiency of fuel nozzles. More particularly, it is highly desirable to optimize pilot fuel atomization which also improves flame stabilization. It is also highly desirable to reduce intermittency in the overall pilot fuel spray quality over a wide-range of engine operating conditions.

SUMMARY OF THE INVENTION

A pilot fuel injector tip for use in a gas turbine engine fuel nozzle assembly includes substantially concentric primary and secondary pilot fuel nozzles centered about a centerline axis of the pilot fuel injector tip. The primary and secondary pilot fuel nozzles having circular primary and annular secondary exits respectively and the circular primary exit is located axially aft and downstream of the annular secondary exit.

An annular secondary fuel supply passage operable for flowing fuel to the annular secondary exit in the secondary pilot fuel nozzle may include an annular secondary fuel swirler having an annular array of helical spin slots which may have rectangular cross sections.

A fuel nozzle assembly including the pilot fuel injector tip has an annular inwardly tapering conical flowpath section of a pilot swirler flowpath section, a first downstream end of the primary pilot fuel nozzle including the circular primary exit, and a second downstream end of the secondary pilot fuel nozzle including the annular secondary exit. The annular inwardly tapering conical flowpath section surrounds the first and second downstream ends and an inwardly tapering conical wall section radially inwardly bounds the annular inwardly tapering conical flowpath section and defines a conical surface. The circular primary and annular secondary exits are located at or axially forward or upstream of the conical surface.

The fuel nozzle assembly may include an inner pilot swirler located radially outwardly of and adjacent to the dual orifice pilot fuel injector tip, an outer pilot swirler located radially outwardly of the inner swirler, an axially aftwardly or downstream extending injector cooling flowpath disposed radially outwardly of and surrounding the second pilot swirler, an annular wall section radially disposed between the outer pilot swirler and an annular cooling flowpath inlet to the injector cooling flowpath, an annular chamfered leading edge of the annular wall section, and a radially inwardly facing conical chamfered surface of the chamfered leading edge for diverting dirt away from the cooling flowpath inlet to the injector cooling flowpath.

The injector cooling flowpath may be disposed in a pilot housing including a centerbody radially surrounding the pilot mixer. The injector cooling flowpath is radially disposed between a fuel nozzle inner casing and the centerbody. An upstream forward end of the centerbody includes an annular chamfered leading edge of the forward end and a radially inwardly facing conical chamfered surface of the chamfered leading edge.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
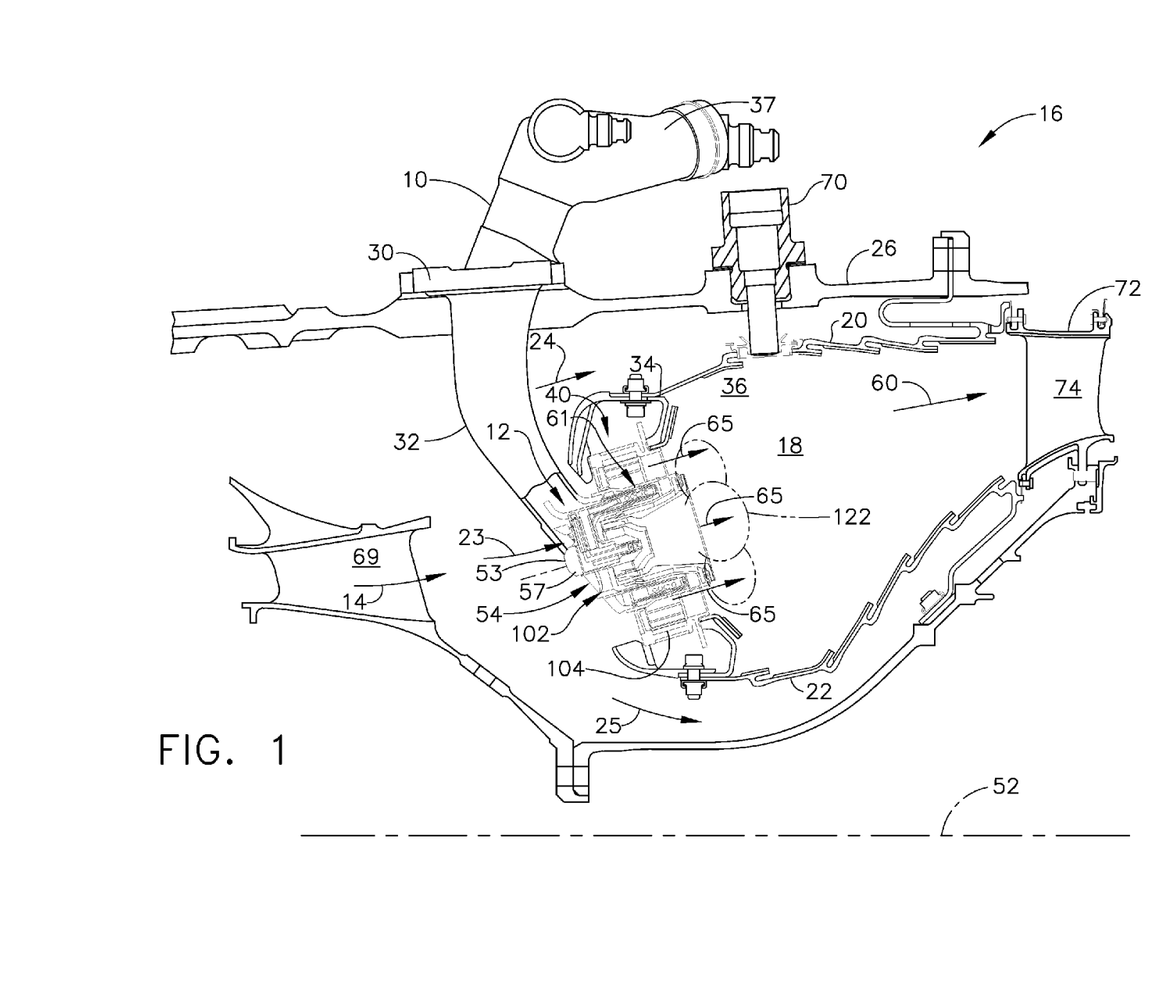
FIG. 1 is a cross-sectional view illustration of a gas turbine engine combustor with an exemplary embodiment of an aerodynamically enhanced fuel nozzle with main and dual orifice pilot nozzles.

Illustrated in FIG. 1 is an exemplary embodiment of a combustor 16 including a combustion zone 18 defined between and by annular radially outer and inner liners 20, 22, respectively circumscribed about an engine centerline 52. The outer and inner liners 20, 22 are located radially inwardly of an annular combustor casing 26 which extends circumferentially around outer and inner liners 20, 22. The combustor 16 also includes an annular dome 34 mounted upstream of the combustion zone 18 and attached to the outer and inner liners 20, 22. The dome 34 defines an upstream end 36 of the combustion zone 18 and a plurality of mixer assemblies 40 (only one is illustrated) are spaced circumferentially around the dome 34. Each mixer assembly 40 includes a main mixer 104 mounted in the dome 34 and a pilot mixer 102.

The combustor 16 receives an annular stream of pressurized compressor discharge air 14 from a high pressure compressor discharge outlet 69 at what is referred to as CDP air (compressor discharge pressure air). A first portion 23 of the compressor discharge air 14 flows into the mixer assembly 40, where fuel is also injected to mix with the air and form a fuel-air mixture 65 that is provided to the combustion zone 18 for combustion. Ignition of the fuel-air mixture 65 is accomplished by a suitable igniter 70, and the resulting combustion gases 60 flow in an axial direction toward and into an annular, first stage turbine nozzle 72. The first stage turbine nozzle 72 is defined by an annular flow channel that includes a plurality of radially extending, circularly-spaced nozzle vanes 74 that turn the gases so that they flow angularly and impinge upon the first stage turbine blades (not shown) of a first turbine (not shown).

The arrows in FIG. 1 illustrate the directions in which compressor discharge air flows within combustor 16. A second portion 24 of the compressor discharge air 14 flows around the outer liner 20 and a third portion 25 of the compressor discharge air 14 flows around the inner liner 22. A fuel injector 10, further illustrated in FIG. 2, includes a nozzle mount or flange 30 adapted to be fixed and sealed to the combustor casing 26. A hollow stem 32 of the fuel injector 10 is integral with or fixed to the flange 30 (such as by brazing or welding) and includes a fuel nozzle assembly 12. The hollow stem 32 supports the fuel nozzle assembly 12 and the pilot mixer 102. A valve housing 37 at the top of the stem 32 contains valves illustrated and discussed in more detail in United States Patent Application No. 20100263382, referenced above.

Figure 2:
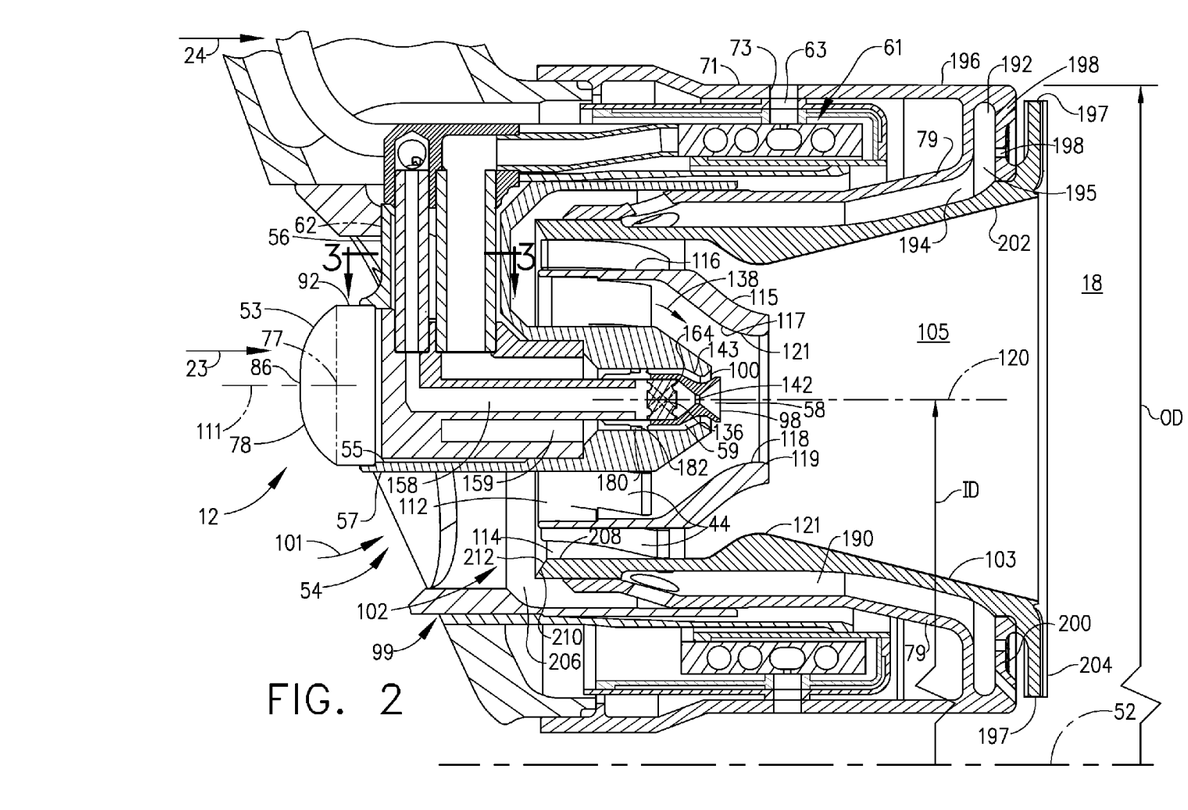
FIG. 2 is an enlarged cross-sectional view illustration of the fuel nozzle illustrated in FIG. 1.

Referring to FIG. 2, the fuel nozzle assembly 12 includes a main fuel nozzle 61 and an annular pilot inlet 54 to the pilot mixer 102 through which the first portion 23 of the compressor discharge air 14 flows. The fuel nozzle assembly 12 further includes a dual orifice pilot fuel injector tip 57 substantially centered in the annular pilot inlet 54. The dual orifice pilot fuel injector tip 57 includes concentric primary and secondary pilot fuel nozzles 58, 59. The pilot mixer 102 includes a centerline axis 120 about which the dual orifice pilot fuel injector tip 57, the primary and secondary pilot fuel nozzles 58, 59, the annular pilot inlet 54 and the main fuel nozzle 61 are centered and circumscribed.

The main fuel nozzle 61 is spaced radially outwardly of the primary and secondary pilot fuel nozzles 58, 59. The secondary pilot fuel nozzle 59 is radially located directly adjacent to and surrounds the primary pilot fuel nozzle 58. The primary and secondary pilot fuel nozzles 58, 59 and main fuel nozzle 61 and the mixer assembly 40 are used to deliver the fuel air mixture 65 to the combustion zone 18. The main fuel nozzle 61 includes a circular or annular array of radially outwardly open fuel injection orifices 63. A fuel nozzle outer casing 71 surrounds the main fuel nozzle 61 and includes cylindrical fuel spray holes 73 aligned with the fuel injection orifices 63.

A pilot housing 99 includes a centerbody 103 and radially inwardly supports the pilot fuel injector tip 57 and radially outwardly supports the main fuel nozzle 61. The centerbody 103 is radially disposed between the pilot fuel injector tip 57 and the main fuel nozzle 61. The centerbody 103 surrounds the pilot mixer 102 and defines a chamber 105 that is in flow communication with, and downstream from, the pilot mixer 102. The pilot mixer 102 radially supports the dual orifice pilot fuel injector tip 57 at a radially inner diameter ID and the centerbody 103 radially supports the main fuel nozzle 61 at a radially outer diameter OD with respect to the engine centerline 52. The main fuel nozzle 61 is disposed within the main mixer 104 (illustrated in FIG. 1) of the mixer assembly 40 and the dual orifice pilot fuel injector tip 57 is disposed within the pilot mixer 102.

The pilot mixer 102 includes an inner pilot swirler 112 located radially outwardly of and adjacent to the dual orifice pilot fuel injector tip 57, an outer pilot swirler 114 located radially outwardly of the inner pilot swirler 112, and a swirler splitter 116 positioned therebetween. The swirler splitter 116 extends downstream of the dual orifice pilot fuel injector tip 57 and a venturi 118 is formed in a downstream portion 115 of the swirler splitter 116. The venturi 118 includes a converging section 117, a diverging section 119, and a throat 121 therebetween. The throat 121 is located downstream of a primary exit 98 of the primary pilot fuel nozzle 58. The inner and outer pilot swirlers 112, 114 are generally oriented parallel to the centerline axis 120 of the dual orifice pilot fuel injector tip 57 and the mixing assembly 40. The inner and outer pilot swirlers 112, 114 include a plurality of swirling vanes 44 for swirling air traveling therethrough. Fuel and air are provided to pilot mixer 102 at all times during the engine operating cycle so that a primary combustion zone 122 (illustrated in FIG. 1) is produced within a central portion of combustion zone 18.

The primary and secondary pilot fuel nozzles 58, 59 have circular primary and annular secondary exits 98, 100 respectively, are operable to inject fuel in a generally downstream direction, and are often referred to as a dual orifice nozzle. The main fuel nozzle 61 is operable to inject fuel in a generally radially outwardly direction through the circular array of radially outwardly open fuel injection orifices 63. The primary pilot fuel nozzle 58 includes a primary fuel supply passage 158 which feeds fuel to the circular primary exit 98 at a first downstream end 142 of the primary pilot fuel nozzle 58. The secondary pilot fuel nozzle 59 includes an annular secondary fuel supply passage 159 which flows fuel to the annular secondary exit 100 at a second downstream end 143 of the secondary pilot fuel nozzle 59.

Referring to FIGS. 2 and 5-7, a primary fuel swirler 136 adjacent the downstream end 142 of the primary fuel supply passage 158 is used to swirl the fuel flow exiting the circular primary exit 98. The exemplary primary fuel swirler 136 illustrated herein is a cylindrical plug having downstream and circumferentially angled fuel injection holes 164 to pre-film a divergent conical primary exit orifice 166 of the primary pilot fuel nozzle 58 with fuel which improves atomization of the fuel. The conical primary exit orifice 166 culminates at the circular primary exit 98. The primary fuel swirler 136 swirls the fuel and centrifugal force of the swirling fuel forces the fuel against a divergent primary conical surface 168 of the conical primary exit orifice 166 thus pre-filming the fuel along the primary conical surface 168.

Referring to FIGS. 2 and 5-7, an annular secondary fuel swirler 137 in the annular secondary fuel supply passage 159 adjacent the downstream end 143 of the secondary pilot fuel nozzle 59 is used to swirl the fuel flow exiting the annular secondary exit 100. The exemplary secondary fuel swirler 137, as illustrated herein, is an annular array 180 of helical spin slots 182 operable to pre-film a divergent conical secondary exit orifice 167 of the secondary pilot fuel nozzle 59 with fuel which improves atomization of the fuel. The helical spin slots 182 are illustrated herein as having a rectangular cross section 183 with respect to fuel flow direction through the helical spin slots 182. The conical secondary exit orifice 167 culminates at the annular secondary exit 100. The secondary fuel swirler 137 swirls the fuel and centrifugal force of the swirling fuel forces it against a divergent secondary conical surface 169 of the conical secondary exit orifice 167 thus pre-filming the fuel along the secondary conical surface 169.

Concentric annular primary and secondary fuel films from the concentric primary and secondary pilot fuel nozzles 58, 59 respectively merge together and the combined fuel is atomized by an air stream from the pilot mixer 102 which is at its maximum velocity in a plane in the vicinity of the annular secondary exit 100. In order to reduce interaction between the primary and secondary fuel films ejected from the concentric primary and secondary pilot fuel nozzles 58, 59, the circular primary exit 98 is located axially aft and downstream of the annular secondary exit 100. This results in physically separating the primary and secondary fuel films after they are ejected from the concentric primary and secondary pilot fuel nozzles 58, 59.

This separation better positions the fuel films within a shear layer of inner pilot swirler flow 138 from the inner pilot swirler 112 and improves fuel atomization and reduces intermittency in the overall spray quality over a wide-range of engine operating conditions. This also allows an accurate placement of fuel close to the shear layers to provide maximum flexibility which in turn plays a major role in emissions and engine operability over a range of engine operating conditions. Locating the circular primary exit 98 axially aft and downstream of the annular secondary exit 100 allows the pre-filming primary conical surface 168 of the conical primary exit orifice 166 of the primary pilot fuel nozzle 58 and the secondary conical surface 169 of the conical secondary exit orifice 167 of the secondary pilot fuel nozzle 59 to release fuel closest to the incoming shear layer and do so consistently for a variety of fueling modes and engine operating conditions.

Figure 5:
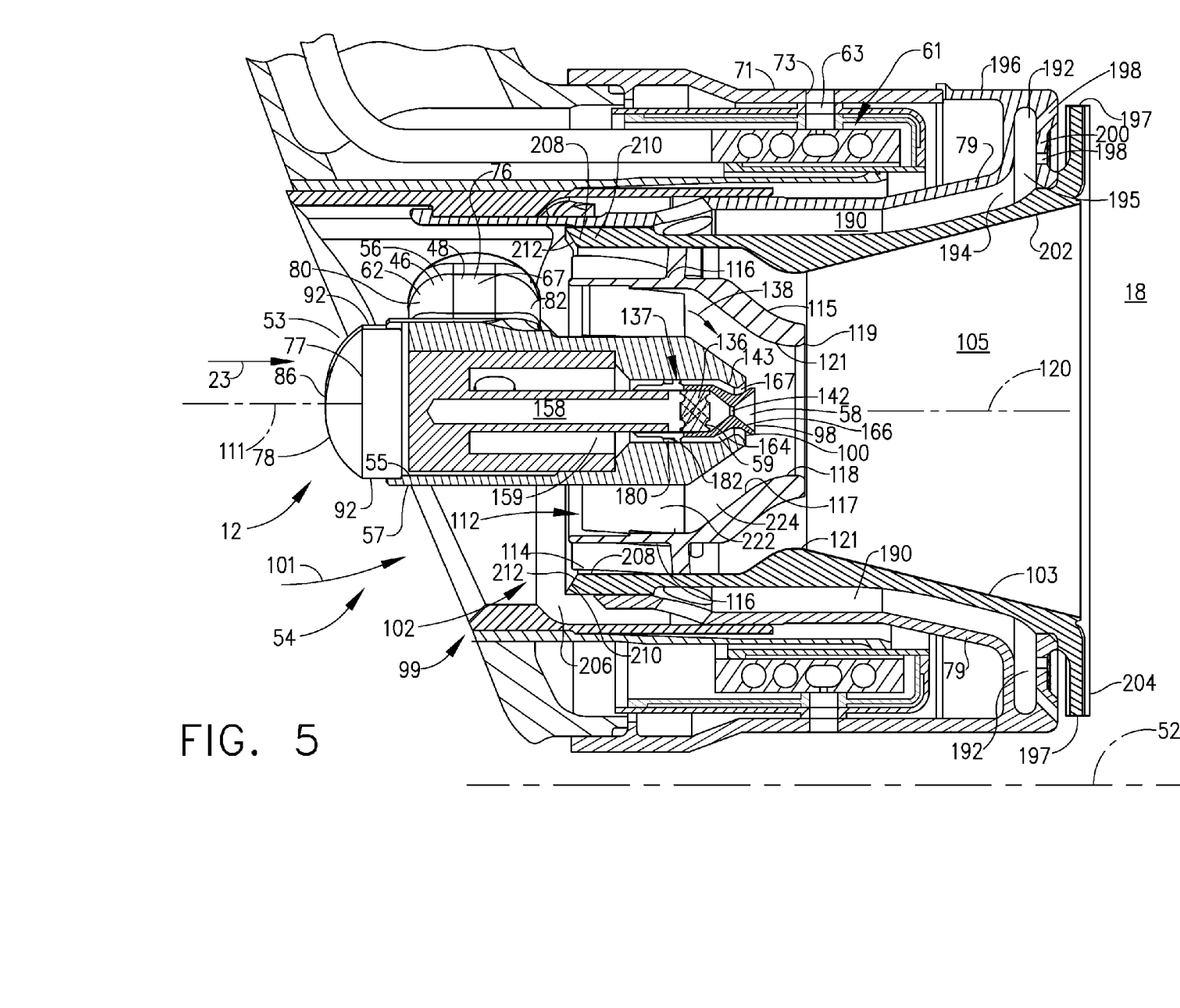
FIG. 5 is a longitudinal sectional view illustration of fuel nozzle illustrated in FIG. 2.
Figure 6:
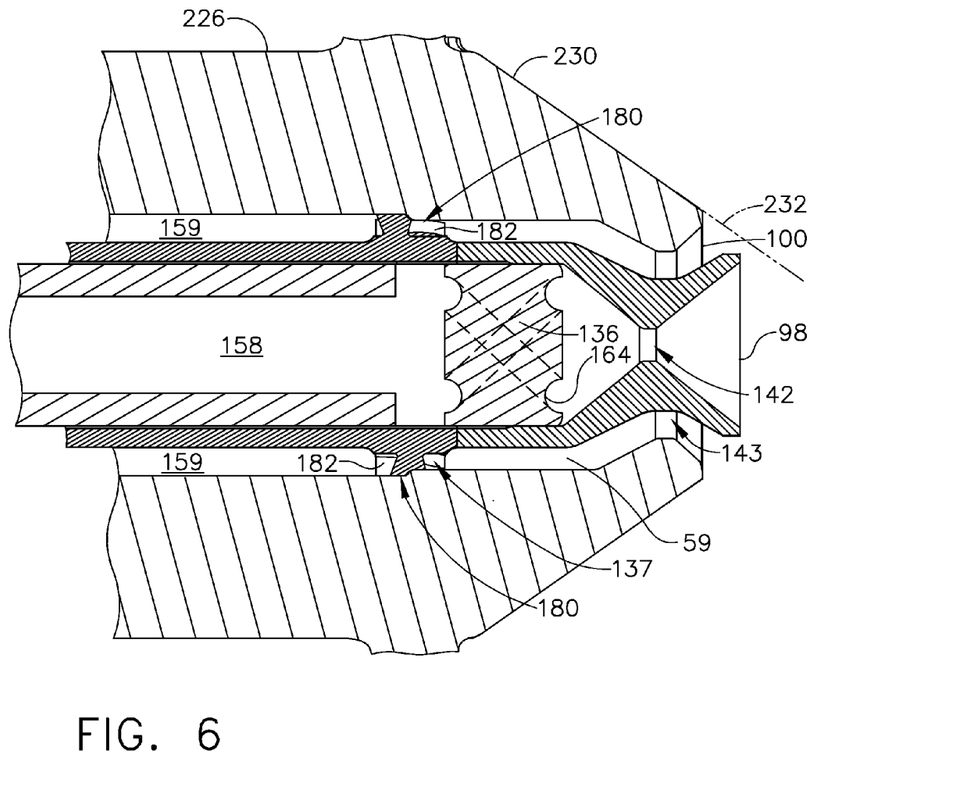
FIG. 6 is a longitudinal sectional view illustration of an exemplary embodiment of a dual orifice pilot fuel injector tip having substantially concentric primary and secondary pilot fuel nozzles in the fuel nozzle illustrated in FIG. 2.
Figure 7:
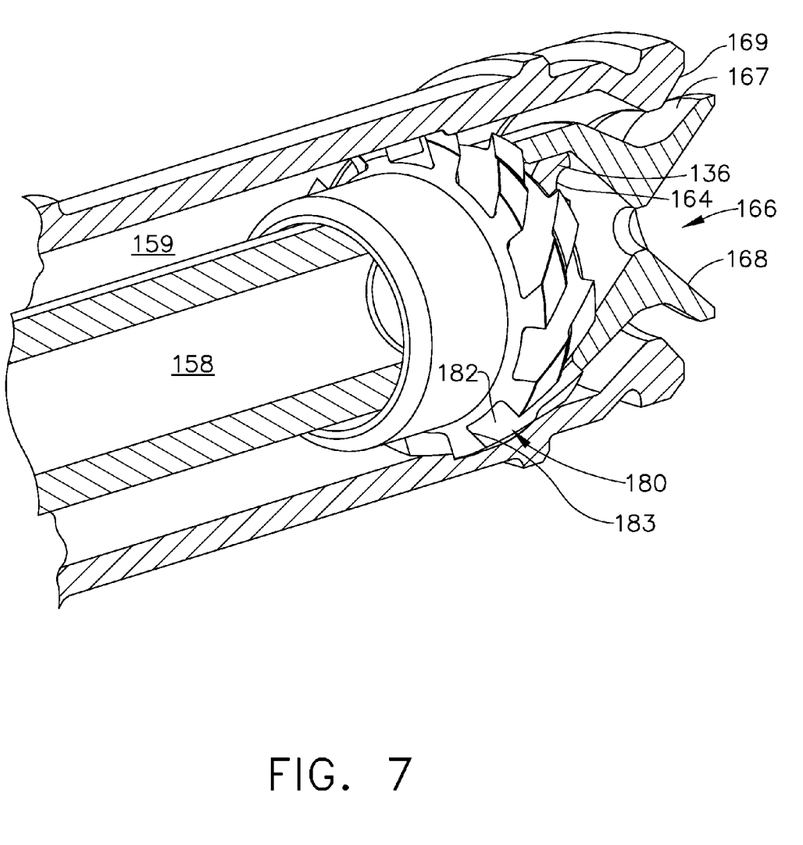
FIG. 7 is cut-away perspective view illustration of the dual orifice pilot fuel injector tip illustrated in FIG. 2 with helical fuel swirling slots in the secondary pilot fuel nozzle.

Referring to FIGS. 5 and 6, the inner pilot swirler 112 has a generally cylindrical inner pilot swirler flowpath section 222 followed by an annular inwardly tapering conical flowpath section 224 between the swirler splitter 116 and a radially outer wall 226 of the pilot fuel injector tip 57. The conical flowpath section 224 surrounds the first downstream end 142 of the primary pilot fuel nozzle 58 including the circular primary exit 98. The conical flowpath section 224 also surrounds the second downstream end 143 of the secondary pilot fuel nozzle 59 including the annular secondary exit 100.

The inwardly tapering conical flowpath section 224 is radially inwardly bounded by an inwardly tapering conical wall section 230 of the radially outer wall 226 in the converging section 117 of the venturi 118. Illustrated in FIG. 6 is a conical surface 232 in space defined by the inwardly tapering conical wall section 230. The circular primary and annular secondary exits 98, 100 may be axially located substantially up to but not axially aft or downstream of the conical surface 232 in order to release fuel closest to the incoming shear layer and do so consistently for a variety of fueling modes and engine operating conditions.

Figure 3:
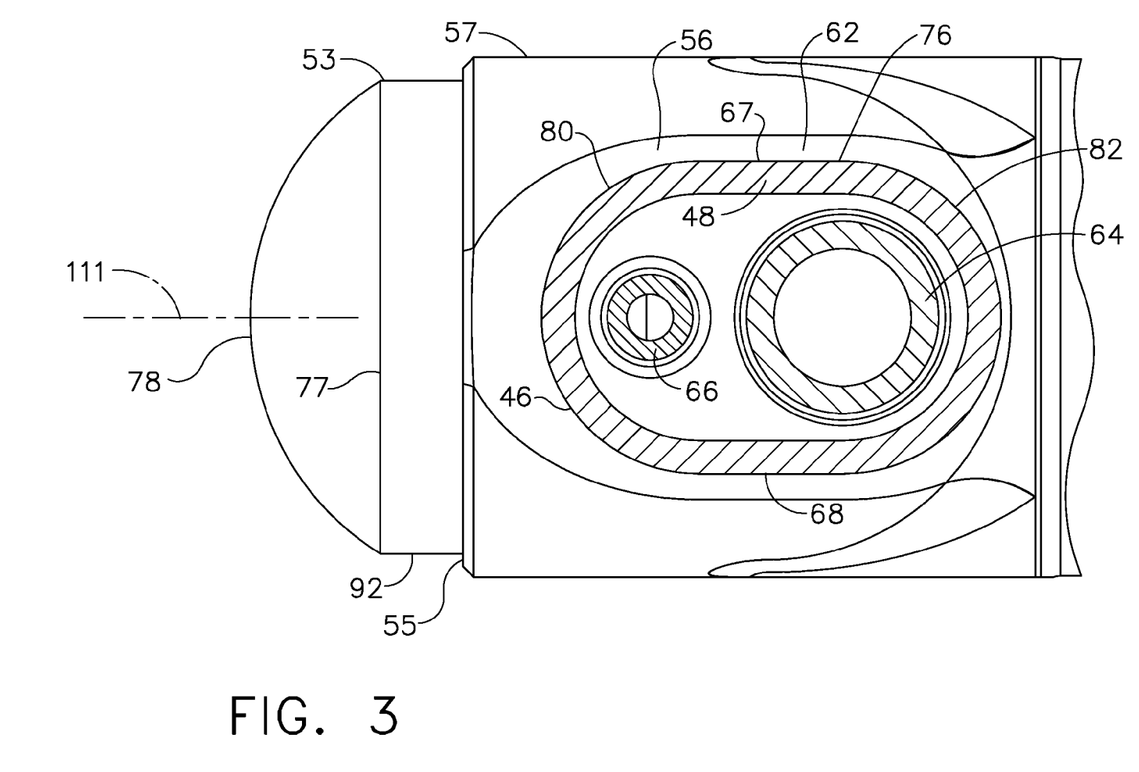
FIG. 3 is a cross-sectional view illustration of a cross over arm in the fuel injector taken through 3-3 in FIG. 2.
Figure 4:
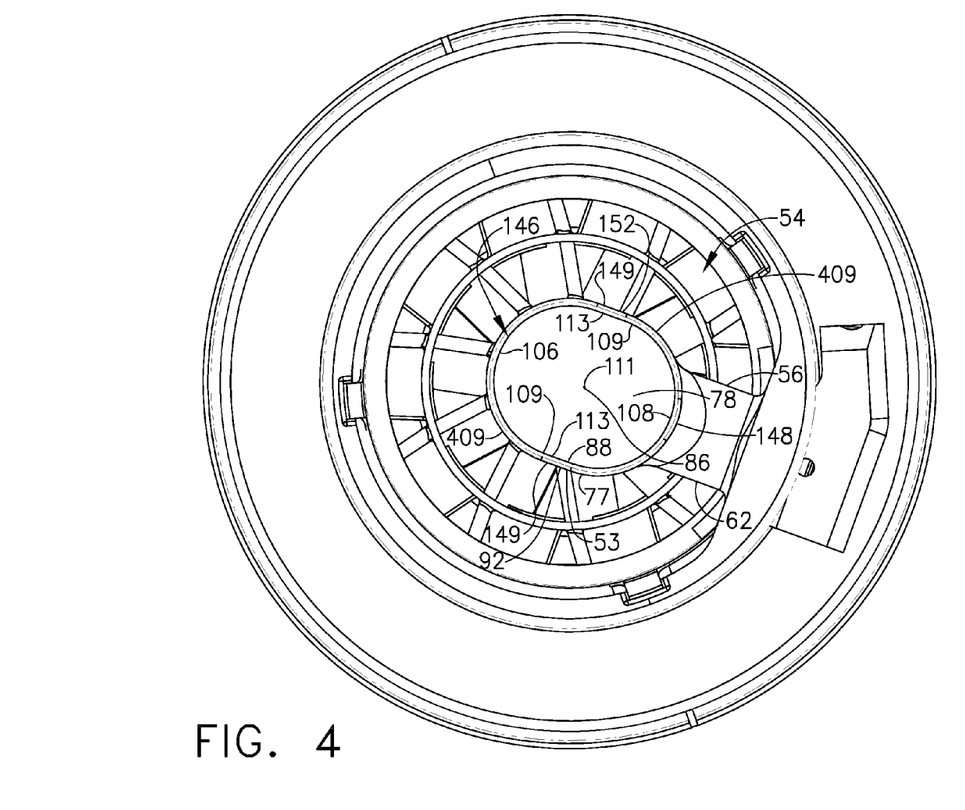
FIG. 4 is an axial perspective view illustration of the fuel nozzle illustrated in FIG. 2.

A cross over arm 56, illustrated in FIGS. 2, 3, and 4, extends radially across the annular pilot inlet 54 from the main fuel nozzle 61 to the pilot fuel injector tip 57. The cross over arm 56 includes an aerodynamically drag reducing cross over arm fairing 62, or tube, surrounding primary and secondary fuel transfer tubes 64, 66 used to transfer fuel across the annular pilot inlet 54 to the primary and secondary fuel supply passages 158, 159 respectively in the pilot fuel injector tip 57. The cross over arm fairing 62 includes rounded leading and trailing edges 80, 82 and generally flat and generally circumferentially spaced apart flat first and second sides 67, 68 defining a rectangular middle section 76 extending between the rounded leading and trailing edges 80, 82. The rounded leading and trailing edges 80, 82 illustrated herein are semi-cylindrical. The rounded leading edge 80 is representative of a rounded forebody 46 and the rectangular middle section 76 with the spaced apart flat first and second sides 67, 68 is representative of a straight afterbody 48.

Referring to FIGS. 1-5 and 8, an aerodynamically drag reducing pilot nose cap 53 also referred to as a bullet nose or rounded nose is located at an upstream end 55 of the pilot fuel injector tip 57. The pilot nose cap 53 includes a rounded or more specifically a generally oval shaped nose base 77 and a substantially rounded dome 78 extending forwardly or upstream from the nose base 77. A cylindrical nose afterbody 92 or more specifically a substantially oval cylindrical nose afterbody 92 extends axially aft or downstream from the nose base 77. The nose afterbody 92 is centered about and parallel to a pilot nose centerline 111 perpendicular or normal to the nose base 77. The rounded dome 78 is representative of a rounded forebody 46 and the nose afterbody 92 is representative of a straight afterbody 48.

Figure 8:
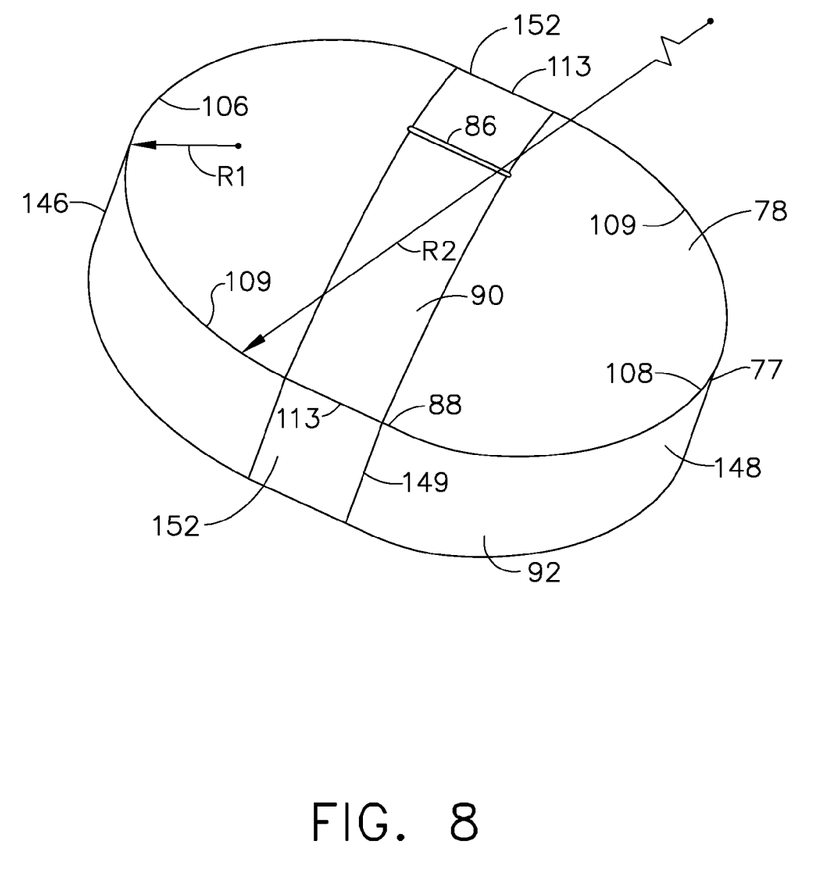
FIG. 8 is a perspective view diagrammatic illustration of a pilot nose cap of the pilot fuel injector tip of the fuel nozzle illustrated in FIG. 2.

The pilot nose centerline 111 is illustrated herein as collinear with the centerline axis 120 about which the pilot fuel injector tip 57 is centered and circumscribed. Alternatively, the pilot nose centerline 111 may be angled and/or slightly offset with respect to the centerline axis 120 to more evenly distribute and align pilot airflow 101 flowing into the pilot mixer 102 and its inner and outer pilot swirlers 112, 114. The pilot nose centerline 111 may be angled up to about 10 degrees with respect to the centerline axis 120.

As illustrated herein, the pilot nose cap 53 includes a generally oval shaped nose base 77 and a substantially rounded dome 78 extending forwardly or upstream from the nose base 77. The dome 78 is illustrated herein as a generally oval rounded dome having a slight blunted or flat top 86. The nose base 77 has a generally oval perimeter 88 with circular first and second end segments 106, 108 connected by spaced apart substantially curved side segments 109. The circular first and second end segments 106, 108 are mirror image arcs having first radii R1. The exemplary curved side segments 109 are illustrated herein as being generally mirror image arcs having second radii R2 substantially greater than the first radii R1. The exemplary curved side segments 109 illustrated herein also include straight middle sections 113 centered in the curved side segments 109. A center conical section 90 of the dome 78 extends forwardly or upstream from the straight middle sections 113 of the curved side segments 109 and illustrated herein as having a rectangular flat top 86.

The nose afterbody 92 is illustrated as having oval cross sectional shape matching the oval perimeter 88 of the nose base 77. The nose afterbody 92 extends aft or downstream from and at substantially 90 degrees from or normal to the nose base 77. The nose afterbody 92 includes spaced apart rounded first and second ends 146, 148 corresponding to the circular first and second end segments 106, 108. The nose afterbody 92 further includes spaced apart generally curved sides 409 corresponding to the curved side segments 109 of the oval perimeter 88. The exemplary embodiment of the nose afterbody 92 illustrated herein also includes a rectangular middle section 149 disposed between the rounded first and second ends 146, 148. The rectangular middle section 149 includes spaced apart flat sides 152 corresponding to the straight middle sections 113 of the oval perimeter 88. The curved and flat sides 409, 152 extend aft or downstream from the curved side segments 109 and straight middle sections 113 respectively of the oval perimeter 88.

The cross over arm fairing 62 and the pilot nose cap 53 are both example of fuel injector fairings designed to minimize flow obstruction, avoid asymmetric flow, and maximize the pilot airflow 101 through the pilot mixer 102 and its inner and outer pilot swirlers 112, 114. The fuel injector fairings are designed to promote pilot flame stabilization by increasing pilot inner swirl number and improve pilot atomization by increasing pilot air velocity of the pilot airflow 101. The cross over arm fairing 62 and the pilot nose cap 53 have rounded forebodies 46 followed by straight afterbodies 48. The exemplary embodiment of the fuel nozzle assembly 12 illustrated herein depicts the straight afterbodies 48 as being parallel to the pilot nose centerline 111.

Referring to FIGS. 2 and 5, an axially or downstream extending injector cooling flowpath 190 is disposed in the pilot housing 99 and radially between a fuel nozzle inner casing 79 and the centerbody 103. The main fuel nozzle 61 is radially disposed outwardly of and supported at least in part by the fuel nozzle inner casing 79. The injector cooling flowpath 190 extends axially downstream or aft from the annular pilot inlet 54 to an aft annular plenum 192 at an aft end 194 of the injector cooling flowpath 190. The aft annular plenum 192 includes an annular groove, slot, or pocket 195 in a radially outwardly extending aft flange 196 of the fuel nozzle inner casing 79 and is radially inwardly bounded by the centerbody 103. Cooling holes 198 through an axially aft annular wall 200 of the aft flange 196 direct cooling air from the aft annular plenum 192 onto a radially outwardly extending aft heat shield flange 197 on an aft end 202 of the centerbody 103. An annular heat shield 204 faces the combustion zone 18 and is mounted on the heat shield flange 197.

An annular cooling flowpath inlet 206 to the injector cooling flowpath 190 is radially inwardly bounded by the centerbody 103. An upstream forward end 208 of the centerbody 103 is radially disposed between the outer pilot swirler 114 and the fuel nozzle inner casing 79 and operates as a flow splitter between the outer pilot swirler 114 and the annular cooling flowpath inlet 206 to the injector cooling flowpath 190. The forward end 208 of the centerbody 103 is an annular wall section including an annular chamfered leading edge 210 having a radially inwardly facing conical chamfered surface 212. The chamfered leading edge 210 operates as a dirt deflector that diverts dirt in the pilot airflow 101 away from the cooling flowpath inlet 206.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A fuel nozzle assembly comprising:
a pilot fuel injector tip substantially centered about a centerline axis in an annular pilot inlet to a pilot mixer,
substantially concentric primary and secondary pilot fuel nozzles in the pilot fuel injector tip,
the primary and secondary pilot fuel nozzles having divergent conical primary and secondary exit orifices culminating at circular primary and annular secondary exits respectively,
the circular primary exit located axially aft and downstream of the annular secondary exit,
an inner pilot swirler located radially outwardly of and adjacent to the pilot fuel injector tip,
an outer pilot swirler located radially outwardly of the inner swirler,
an axially aft or downstream extending injector cooling flowpath disposed radially outwardly of and surrounding the outer pilot swirler,
an annular wall section radially disposed between the outer pilot swirler and an annular cooling flowpath inlet to the injector cooling flowpath, and
an annular chamfered leading edge of the annular wall section having a radially inwardly facing conical chamfered surface.

2. A fuel injector as claimed in claim 1, further comprising:
a splitter radially positioned between the inner and outer pilot swirlers,
the inner pilot swirler including a generally cylindrical inner pilot swirler flowpath section upstream and axially forward of an annular inwardly tapering conical flowpath section between the splitter and a radially outer wall of the pilot fuel injector tip,
an inwardly tapering conical wall section of the radially outer wall radially inwardly bounding the annular inwardly tapering conical flowpath section,
a conical surface defined by the inwardly tapering conical wall section, and
the circular primary and annular secondary exits located at or axially forward or upstream of the conical surface.

3. A fuel nozzle assembly as claimed in claim 2, further comprising:
an annular secondary fuel supply passage operable for flowing fuel to the annular secondary exit in the secondary pilot fuel nozzle,
an annular secondary fuel swirler in the secondary fuel supply passage, and
the secondary fuel swirler including an annular array of helical spin slots.

4. A fuel nozzle assembly as claimed in claim 1, further comprising:
- a pilot housing including a centerbody radially surrounding the pilot mixer,
- the axially or downstream extending injector cooling flowpath disposed in the pilot housing and radially between a fuel nozzle inner casing and the centerbody, and
- an upstream forward end of the centerbody including the annular chamfered leading edge of the forward end.

5. A fuel nozzle assembly as claimed in claim 4, further comprising:
- the inner pilot swirler located radially outwardly of and adjacent to the pilot fuel injector tip,
- the outer pilot swirler located radially outwardly of the inner pilot swirler, and
- a splitter radially positioned between the inner and outer pilot swirlers.

6. A fuel nozzle assembly as claimed in claim 5, further comprising a main fuel nozzle including a circular or annular array of radially outwardly open fuel injection orifices located radially outwardly of the primary and secondary pilot fuel nozzles and supported at least in part by the fuel nozzle inner casing.

* * * * *